(12) United States Patent
Atmur et al.

(10) Patent No.: US 9,404,489 B1
(45) Date of Patent: *Aug. 2, 2016

(54) PERISTALTIC PUMP SYSTEM AND METHOD USING A VIRTUAL ELLIPSE MOTOR

(71) Applicant: The Boeing Company, Chicago, IL (US)

(72) Inventors: Robert J. Atmur, Whittier, CA (US); William P. Sargent, Fullerton, CA (US)

(73) Assignee: The Boeing Company, Chicago, IL (US)

( * ) Notice: Subject to any disclaimer, the term of this patent is extended or adjusted under 35 U.S.C. 154(b) by 233 days.

This patent is subject to a terminal disclaimer.

(21) Appl. No.: 14/031,055

(22) Filed: Sep. 19, 2013

Related U.S. Application Data (63) Continuation-in-part of application No. 13/849,501, filed on Mar. 23, 2013, now Pat. No. 9,281,736.

(51) Int. Cl.
*F04B 43/12* (2006.01)
*H02K 41/06* (2006.01)

(52) U.S. Cl.
CPC ............. *F04B 43/12* (2013.01); *F04B 43/1207* (2013.01); *F04B 43/1292* (2013.01); *H02K 41/065* (2013.01)

(58) Field of Classification Search
CPC ............. F04B 43/1207; F04B 43/0054; F04B 43/0072; F04B 43/12; F04B 43/14; H02K 41/065; A61M 5/14232; A61M 5/14228; A61M 5/16804; A61M 5/16809
See application file for complete search history.

(56) References Cited

U.S. PATENT DOCUMENTS

| | | | | |
|---|---|---|---|---|
| 2,249,806 | A * | 7/1941 | Bogoslowsky | F04B 43/0072 417/476 |
| 2,818,815 | A * | 1/1958 | Corneil | A61M 5/142 417/475 |
| 4,175,398 | A * | 11/1979 | Edwards | B60H 1/00007 62/149 |
| 6,494,692 | B1 | 12/2002 | Green | |
| 8,549,720 | B2 * | 10/2013 | Sahm | B23Q 16/102 29/40 |

* cited by examiner

*Primary Examiner* — Bryan Lettman
*Assistant Examiner* — Thomas Cash
(74) *Attorney, Agent, or Firm* — McDonnell Boehnen Hulbert & Berghoff LLP (57) ABSTRACT

A peristaltic pump and methods are presented. At least one flexible tube is configured to alternately radially compress to constrict fluid passage and radially recover to allow fluid passage. A surface is configured to support the at least one flexible tube. A non-rotating compression plate is configured to: compress the at least one flexible tube by a virtual elliptical wave nutation, and control a flow of a fluid in the at least one flexible tube by compression of the flexible tube.

18 Claims, 12 Drawing Sheets

PERISTALTIC PUMP SYSTEM AND METHOD USING A VIRTUAL ELLIPSE MOTOR

CROSS-REFERENCE TO RELATED APPLICATION

This application claims priority under 35 U.S.C. 120 to and is a continuation-in-part application of U.S. patent application Ser. No. 13/849,501, filed 23 Mar. 2013, content of which is incorporated herein by reference in its entirety.

FIELD

Embodiments of the disclosure relate generally to pumps. More particularly, embodiments of disclosure relate to peristaltic pumps.

BACKGROUND

Peristaltic pumps are used in many industries. Generally, in a peristaltic pump liquid to be pumped passes through a hose which is compressed by a roller arranged to run along a length of the hose. The roller closes the hose and isolates liquid in the hose downstream of a point of compression from liquid upstream in the hose. By moving the roller along the hose, the liquid downstream in the hose is driven further downstream, and so is pumped by the roller. Medical industries generally use peristaltic pumps for pumping of body fluids or fluids to be received by a patient.

A typical peristaltic pump uses a roller to compress a curve in the hose, which results in a high rate of change in a shape of the hose. The high rate of change in the shape of the hose causes a high shear load and drag in the typical peristaltic pump, and a non-optimal handling of a material being pumped (e.g., blood). The high rate of change in the shape of the hose causes a limited angle of operation (e.g., generally less than 180 degrees), and extra motor size and power to manage torque pulsations required to repeatedly engage and disengage the roller.

SUMMARY

A peristaltic pump and methods are presented. At least one flexible tube is configured to alternately radially compress to constrict fluid passage and radially recover to allow fluid passage. A surface is configured to support the flexible tube. A non-rotating compression plate is configured to: compress the flexible tube by a virtual elliptical wave nutation, and control a flow of a fluid in the flexible tube by compression of the flexible tube.

A virtual ellipse motor produces the peristaltic pumping motion, wherein a non-rotating compression plate driven by a plurality of electro-magnets does not rotate. Only a progressive motion of a virtual elliptical wave nutation of the non-rotating compression plate occurs. Thereby, torque ripple is greatly reduced and potential damage on pumped fluids is significantly reduced.

In this manner, a virtual elliptical motor provides a smooth progressive compression of a flexible tube. A non-rotating elliptical wave generator uniformly compresses the flexible tube along a single radial line parallel to the surface of the peristaltic pump. The fluid is moved by the virtual elliptical wave nutation in a smooth and progressive manner. Because motion is directly driven without need of rollers or roller gears, a simpler reduced cost and complexity pump system is provided that also does less potential damage to materials being pumped.

In an embodiment, a peristaltic pump system comprises: at least one flexible tube, a surface, and a non-rotating compression plate. The flexible tube alternately radially compresses to constrict fluid passage and radially recover to allow fluid passage. The surface supports the flexible tube. The non-rotating compression plate compresses the flexible tube by a virtual elliptical wave nutation, and controls a flow of a fluid in the flexible tube by compression of the flexible tube.

In another embodiment, a method for producing a peristaltic pumping motion alternately radially compresses at least one flexible tube to constrict fluid passage and radially recover to allow fluid passage. The method further supports the flexible tube by a surface. The method further compresses the flexible tube by a virtual elliptical wave nutation of a non-rotating compression plate. The method further controls a flow of a fluid in flexible tube by compression of the flexible tube by the non-rotating compression plate.

In a further embodiment, a method of producing a peristaltic pump configures a flexible tube to alternately radially compress to constrict fluid passage and radially recover to allow fluid passage. The method further configures a surface to support the at least one flexible tube, and configures a non-rotating compression plate to compress the at least one flexible tube by a virtual elliptical wave nutation. The method further configures the non-rotating compression plate to control a flow of a fluid in the at least one flexible tube by compression of the flexible tube by the virtual elliptical wave nutation.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to pumps and electric motors may not be described in detail herein. In addition, those skilled in the art will appreciate that embodiments of the present disclosure may be practiced in conjunction with a variety of structural bodies, and that the embodiments described herein are merely example embodiments of the disclosure.

Embodiments of the disclosure are described herein in the context of some non-limiting applications, namely, a blood pump. Embodiments of the disclosure, however, are not limited to such blood pump applications, and the techniques described herein may also be utilized in other applications. For example, embodiments may be applicable to aircraft pumps, automotive pumps, industrial pumps, ship pumps, submarine pumps, consumer product pumps, biological pumps, dialysis machines pumps, heart bypass pumps, medical infusion pumps, tree sap pumps, liquid food and beverage pumps, pharmaceutical isolation pumps, concrete pumps, slurry pumps, or other peristaltic pump applications.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Embodiments of the disclosure provide a desired motion that does not roll a roller along a hose, but rather progressively compress a flexible tube in a smooth continuous motion. A virtual elliptical wave creates a smooth and continuous line that is rotated. A radius of curvature is the same as a radius of the flexible tube in the pumping system, greatly reducing torque ripple and potential damage to pumped fluids. A non-rotating compression plate driven by a plurality of electromagnets does not rotate, only a progressive motion of a virtual elliptical wave nutation of the non-rotating compression plate occurs. That motion is substantially identical to an optimal motion required for peristaltic pumping. Because motion is directly driven without need of rollers or roller gears, a simpler reduced cost and complexity pump system is provided that also does less potential damage to materials being pumped.

Embodiments use a virtual elliptical motor to provide a smooth progressive compression of flexible tubing. The non-rotating elliptical wave generator uniformly compresses the flexible tube along a single radial line parallel to a surface of the peristaltic pump. The fluid is moved by the virtual elliptical wave rotation in a smooth and progressive manner.

Figure 1A:
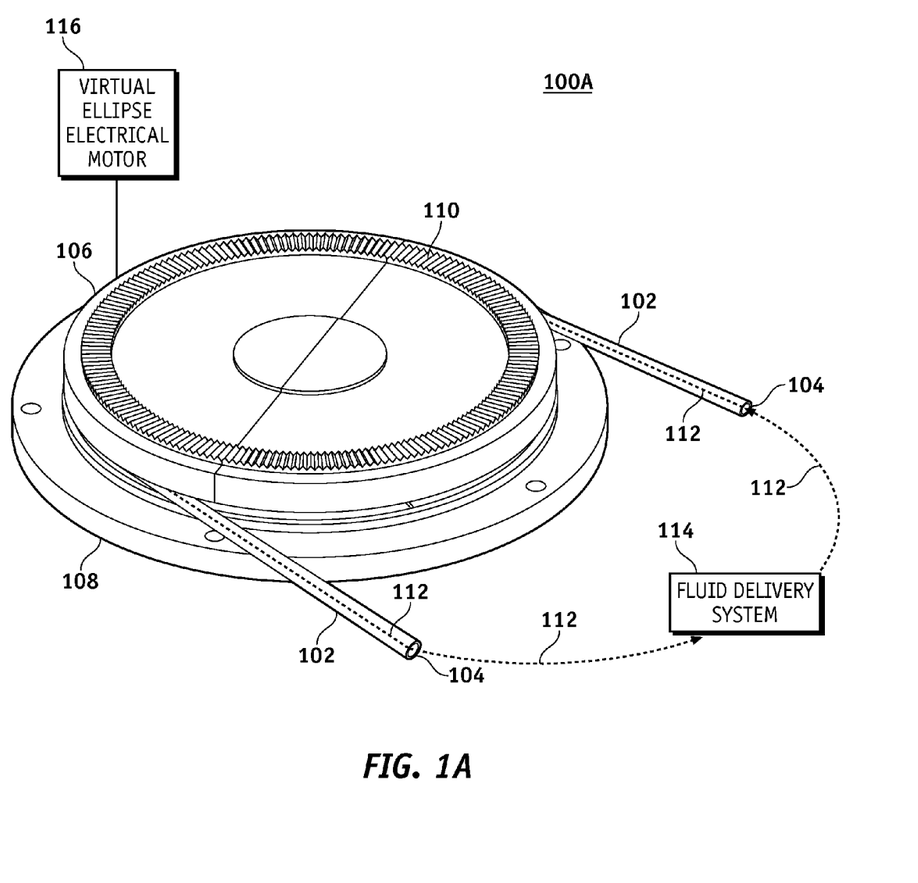
FIG. 1A is an illustration of an exemplary peristaltic pump system showing a single flexible tube and a timing gear that provides an anti-rotation mechanism for a non-rotating compression plate according to an embodiment of the disclosure.

FIG. 1A is an illustration of an exemplary peristaltic pump system (system 100A) comprising a single flexible tube 102 and a timing gear 110 that provides an anti-rotation mechanism for a non-rotating compression plate 106 according to an embodiment of the disclosure. The system 100A comprises the flexible tube 102, the non-rotating compression plate 106, and a surface 108. The system 100A may comprise, for example but without limitation, a medical pump, an aircraft pump, an automotive pump, an industrial pump, a ship pump, a submarine pump, a consumer product pump, a biological pump, or other peristaltic pump.

The flexible tube 102 is configured to alternately radially compress to constrict fluid passage (e.g., block fluid passage) and radially recover to allow fluid passage. The flexible tube 102 smoothly and progressively compresses along a single radial line 614 (FIG. 6) parallel to the surface 108 of the peristaltic pump system 100A. The flexible tube 102 may be coupled to a pump inlet/outlet tubing 104. The flexible tube 102 may comprise, for example but without limitation, a polyvinyl chloride, a silicone rubber, a fluoropolymer, a biocompatible material, or other flexible tube material. The flexible tube 102 may be configured in a circle or semi-circle on the surface 108 and a center 206 (FIG. 2) of the non-rotating compression plate 106.

The surface 108 is configured to support the flexible tube 102. The surface 108 may be configured as a substantially flat planar surface operable to support pressure from the non-rotating compression plate 106. The surface 108 may be configured as the stationary plate 302 (FIGS. 3, 4, and 7) comprising a stationary gear 304 (FIGS. 2-3) that interfaces with the timing gear 110 of the non-rotating compression plate 106. The surface 108 may comprise, for example but without limitation, a metal, a plastic, a composite, or other suitable material.

The non-rotating compression plate 106 is configured to compress the flexible tube 102 by a virtual elliptical wave nutation 400-600 (FIG. 4-6) and control a flow of a fluid 112 in the flexible tube 102 by compression of the flexible tube 102. In this manner, the non-rotating compression plate 106 propels the fluid 112 through the flexible tube 102 by compression of the flexible tube 102. The non-rotating compression plate 106 may propel the fluid 112 through the flexible tube 102 by compression (e.g., radial compression) of the flexible tube 102. The non-rotating compression plate 106 may propel the fluid 112 by compression of the flexible tube 102 through the flexible tube 102 to a fluid delivery system 114.

The fluid delivery system 114 may comprise, for example but without limitation, an aircraft fluid delivery system, a medical fluid delivery system, and industrial fluid delivery system, an automotive fluid delivery system, a ship fluid delivery system, a submarine fluid delivery system, a consumer product fluid delivery system, a biological fluid delivery system, or other fluid delivery system.

Figure 4:
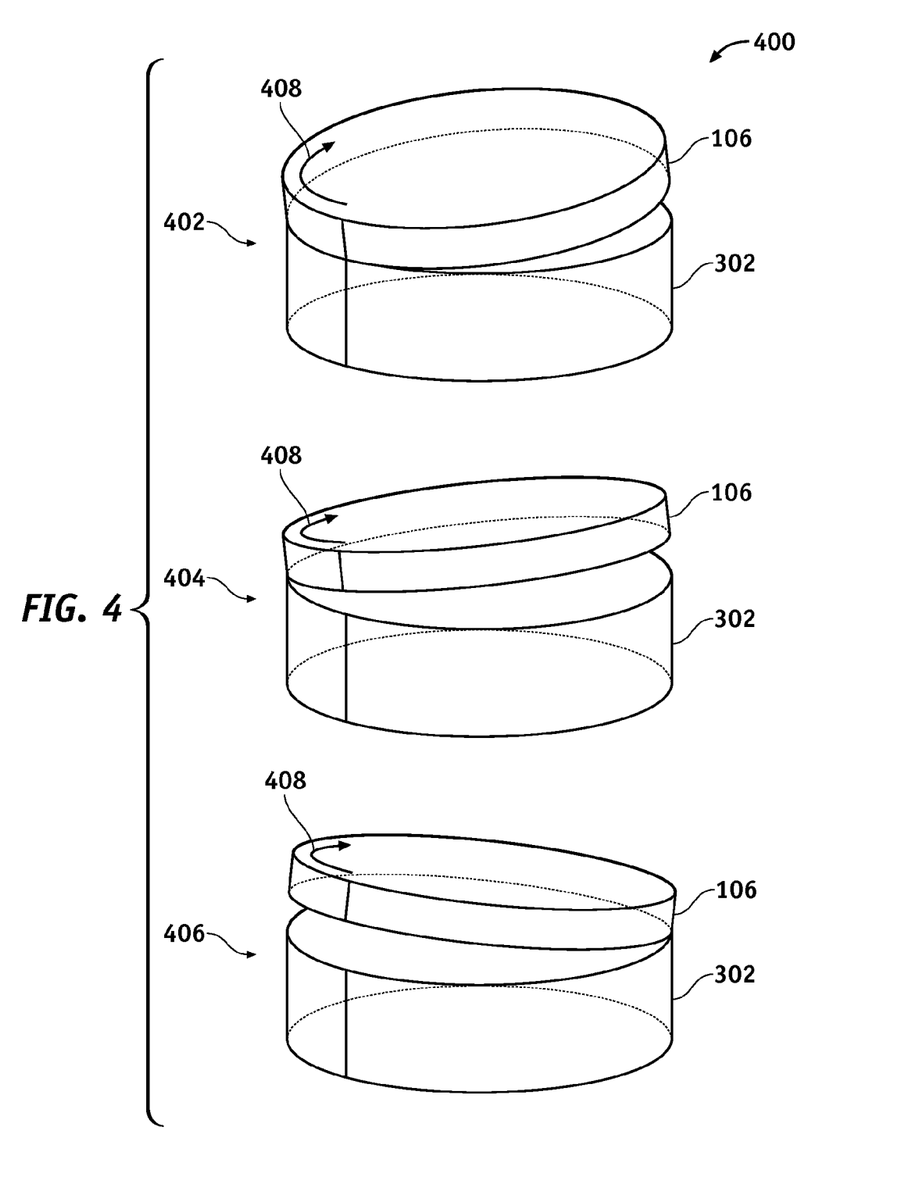
FIGS. 4 and 5 are illustrations of a clock-wise nutation of a non-rotating compression plate according to an embodiment of the disclosure.
Figure 5:
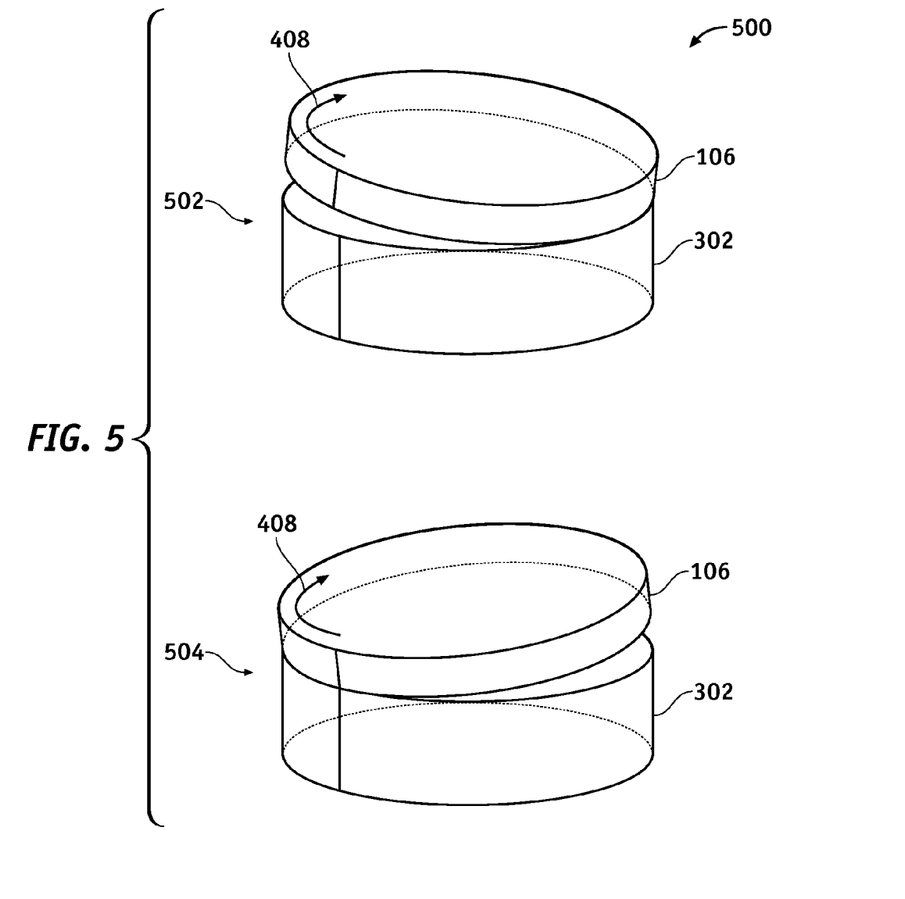
Figure 6:
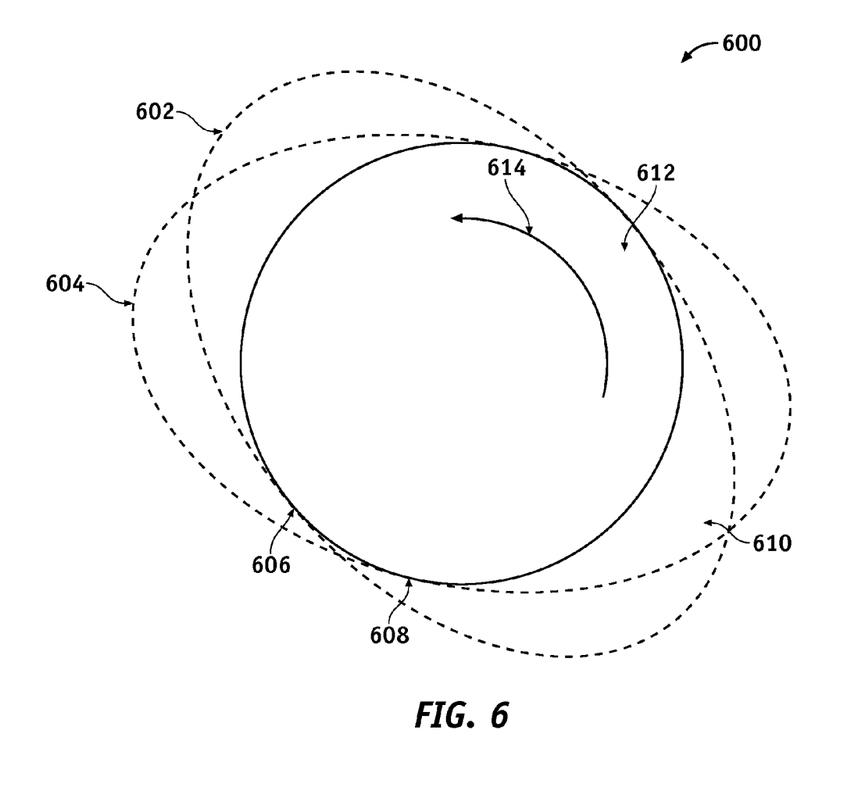
FIG. 6 is an illustration of a relationship of electromagnetic driving force to a counter clock-wise nutation of a non-rotating compression plate according to an embodiment of the disclosure.

The virtual elliptical wave nutation 400-600 is explained in more detail in the context of discussion of FIGS. 4-6. The virtual elliptical wave nutation 400-600 of the non-rotating compression plate 106 may be driven by a virtual ellipse electrical motor 116 explained in more detail below in the context of discussion of FIG. 7.

The non-rotating compression plate 106 comprises the timing gear 110 configured to mesh with the stationary gear 304 (FIGS. 2-3) such that the non-rotating compression plate 106 cannot rotate relative to the stationary gear 304. The timing gear 110 may be configured on the non-rotating compression plate 106 facing the surface 108 (stationary plate 302) and meshing with the stationary gear 304 (FIG. 3). Alternatively, the timing gear 110 may be configured on the non-rotating compression plate 106 on a side not facing the surface 108 (e.g., FIGS. 1A and 1B), and meshing with a stationary gear that is not part of the surface 108. The surface 108/302 and the stationary plate 108/302 may be used interchangeably in this document.

The non-rotating compression plate 106 may comprise, for example but without limitation, a slope, a taper, a conical surface, a conical profile (e.g., at an angle 228 (FIG. 2) from a plane of the non-rotating compression plate 106), or other configuration. The non-rotating compression plate 106 comprises a magnetic material, for example but without limitation, iron, steel, a ferromagnetic material, a ferrimagnetic material, a magnetic composite, or other magnetic material.

Figure 1B:
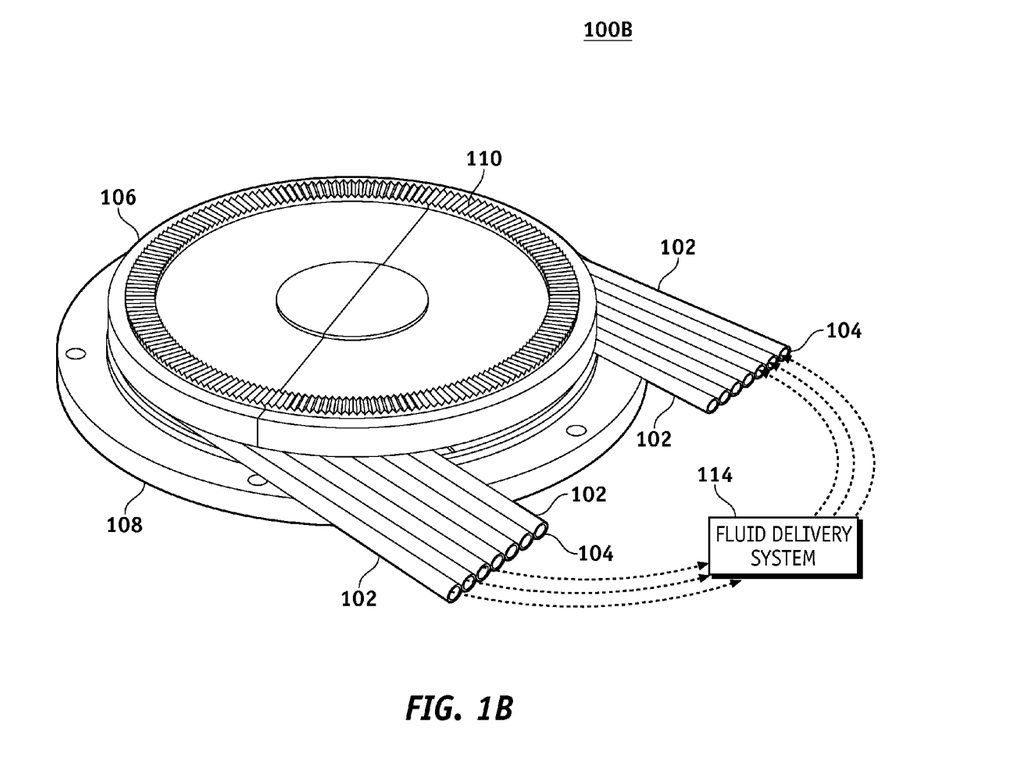
FIG. 1B is an illustration of an exemplary peristaltic pump system showing multiple flexible tubes and a timing gear to provide an anti-rotation mechanism for a non-rotating compression plate according to an embodiment of the disclosure.
Figure 11:
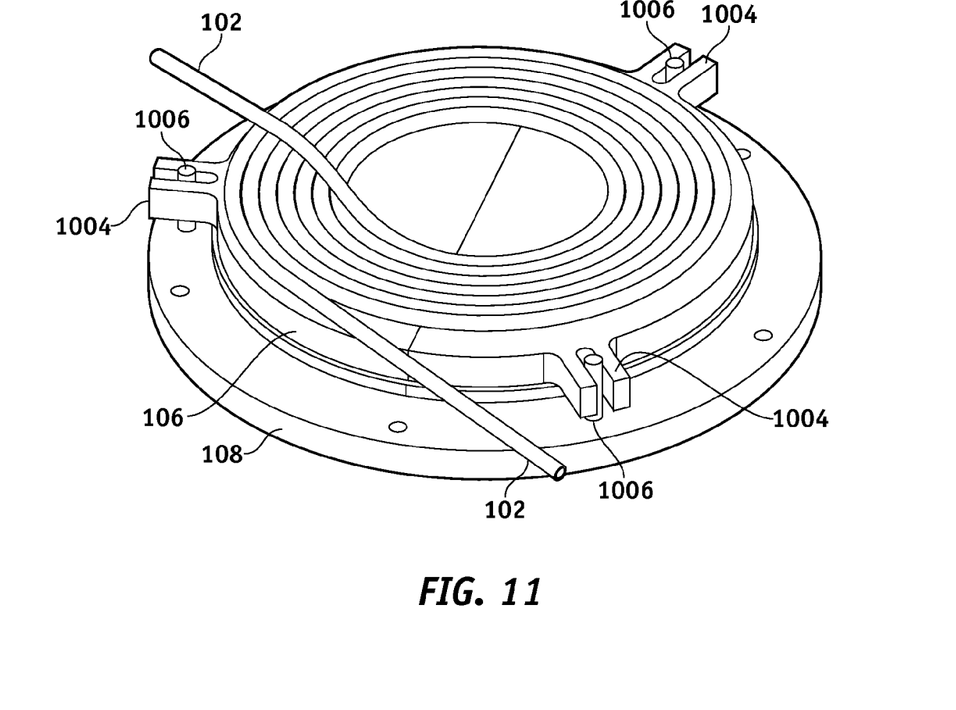
FIG. 11 is an illustration of the exemplary peristaltic pump system of FIG. 10 with the housing removed and showing pins and slots that provide an anti-rotation mechanism for a non-rotating compression plate.

FIG. 1B is an illustration of an exemplary peristaltic pump system 100B showing multiple flexible tubes 102 and the timing gear 110 that provides an anti-rotation mechanism for the non-rotating compression plate 106 according to an embodiment of the disclosure. The tube 102 in the system 100A and 100B may be brought in tangentially on inner radius of the surface 108 and exit tangentially from an outer radius of the surface 108 after completing a total of at least 360 degrees (e.g., typically more) of travel on the surface 108 as shown in FIG. 11 to prevent back flow. The multiple flexible tubes 102 may each be compressed by nutation of the non-rotating compression plate 106 along a respective single radial line such as the single radial line 614 (FIG. 6).

Figure 2:
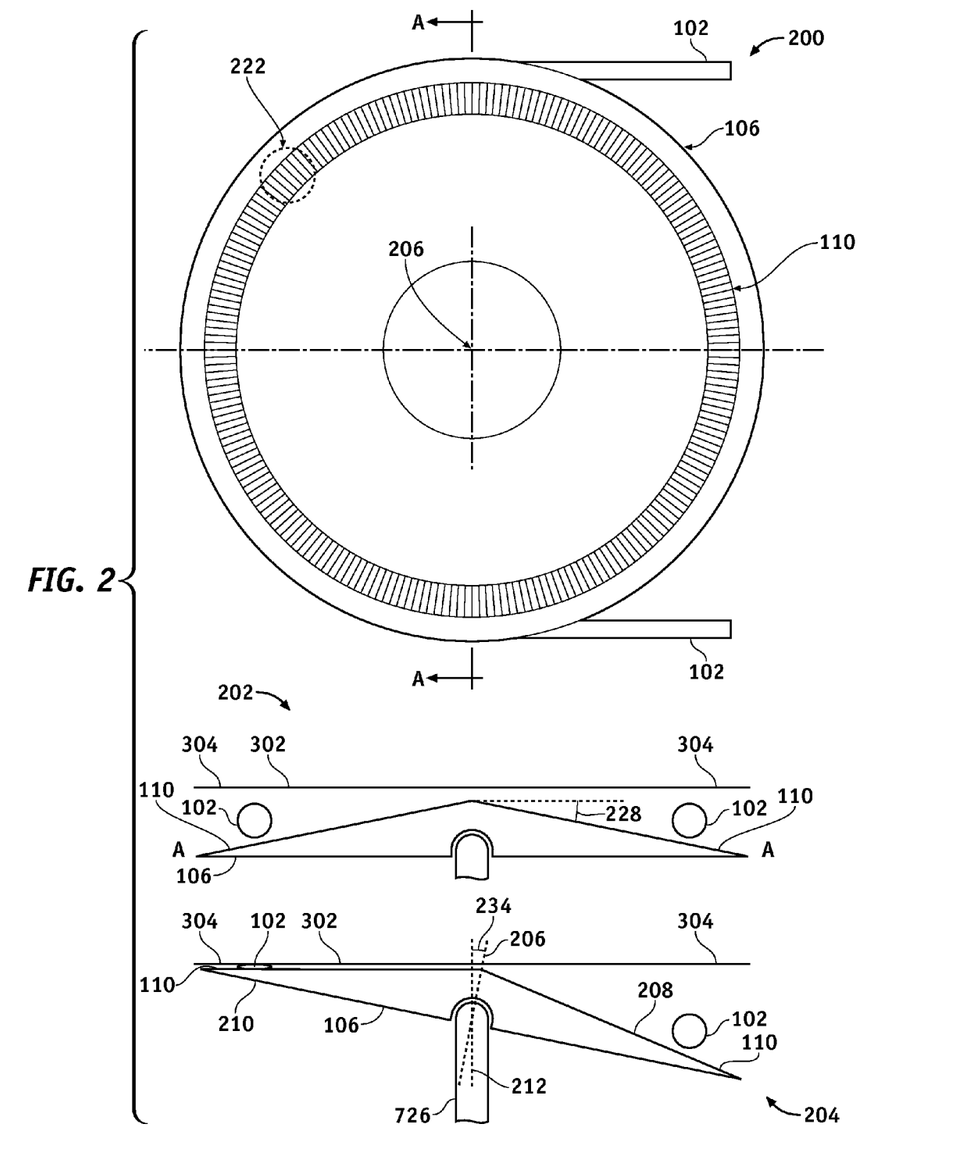
FIG. 2 is an illustration of various views of the non-rotating compression plate of FIG. 1 according to an embodiment of the disclosure.
Figure 3:
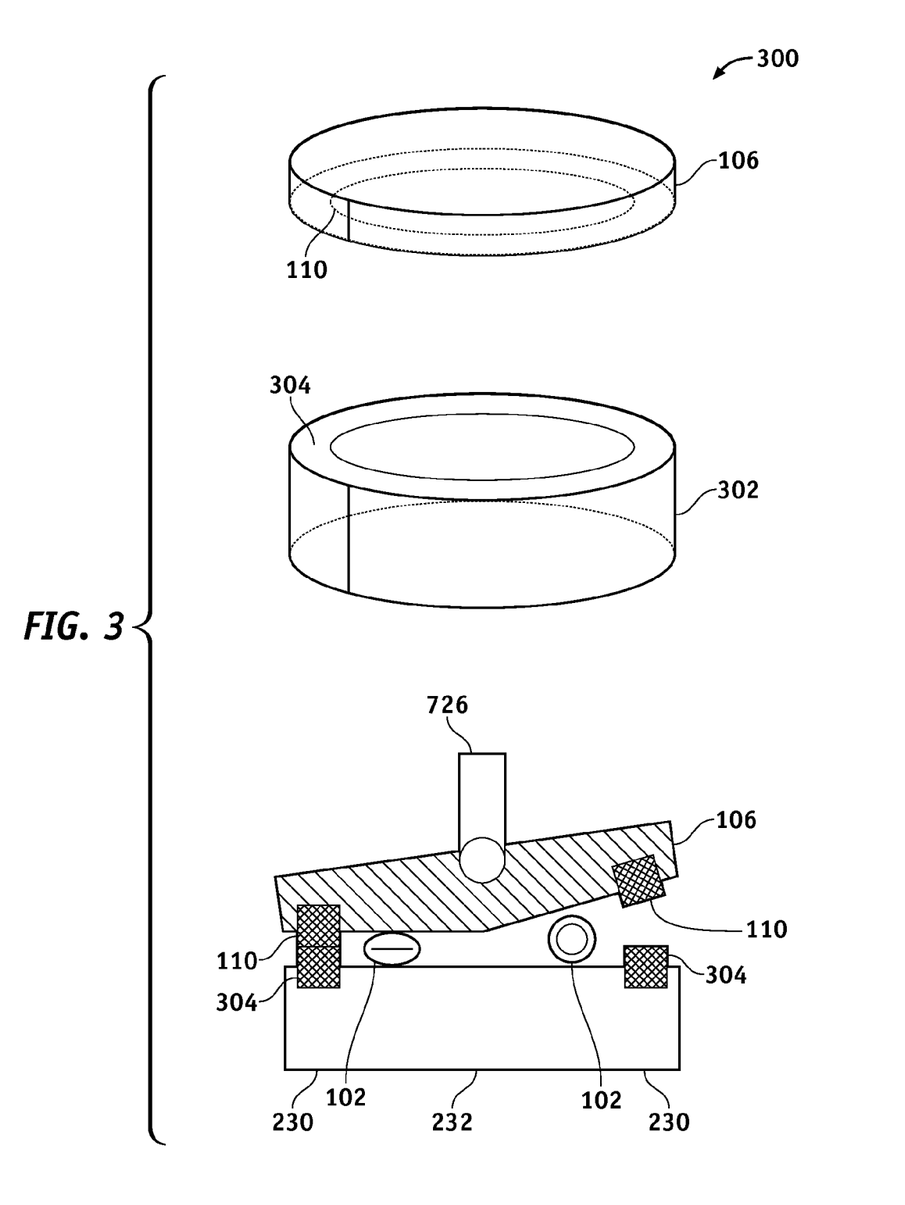
FIG. 3 is an illustration of an interface of a non-rotating compression plate to a stationary gear and a rotational output plate according to an embodiment of the disclosure.

FIG. 2 is an illustration of various views 200/202/204 of the non-rotating compression plate 106 of FIG. 1 according to an embodiment of the disclosure. The view 200 shows a top view of the non-rotating compression plate 106. The view 202 shows a side view of the non-rotating compression plate 106 taken along a line A-A, and showing the non-rotating compression plate 106 in an unpowered disconnected state. The view 204 shows a side view of the non-rotating compression plate 106 taken along the line A-A, and showing the non-rotating compression plate 106 in a powered state with the timing gear 110 of the non-rotating compression plate 106 meshed to the stationary gear 304 of the stationary plate 302. In the view 202, the flexible tube 102 is shown uncompressed, and in the view 204, the flexible tube 102 is shown compressed on a side 210. As the non-rotating compression plate 106 nutates, the flexible tube 102 is compressed in a circle around the surface 302 pushing the fluid 112 through the flexible tube 102.

In the view 200, the timing gear 110 is shown on a side of the non-rotating compression plate 106 opposite to the surface 302 and the flexible tube 102. Thus for the view 200, the stationary gear 304 would be located opposite to the surface 302. In the view 202 and the view 204, the timing gear 110 is shown on a same side of the non-rotating compression plate 106 as the surface 302 and the flexible tube 102.

Figure 7:
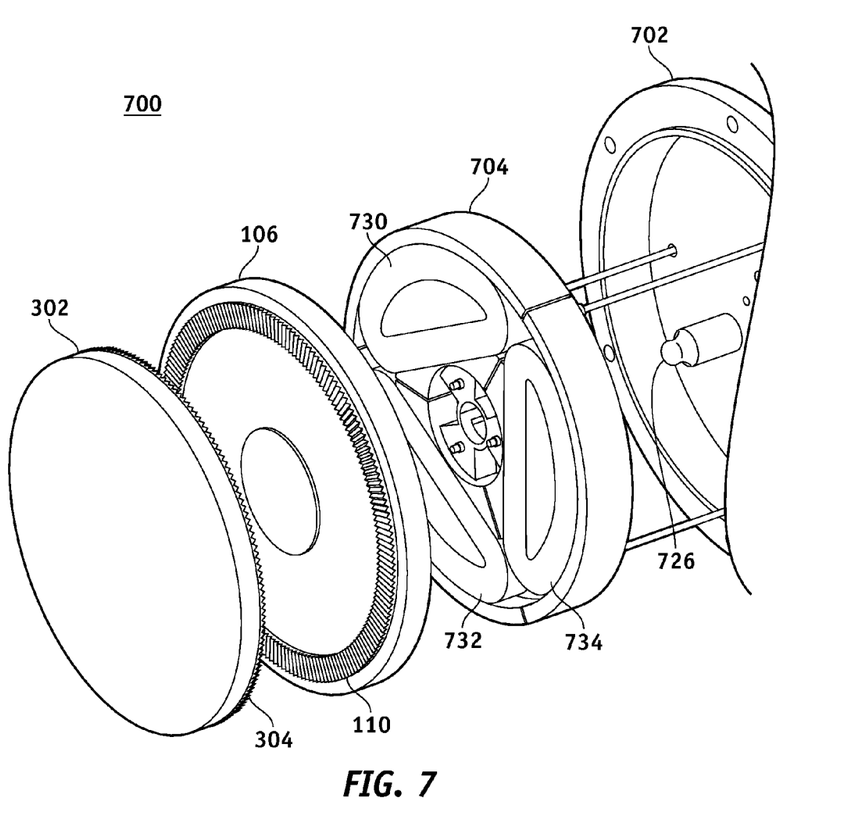
FIG. 7 is an illustration of a partial view of an exemplary virtual ellipse electric motor that can drive the virtual elliptical wave nutation of the non-rotating compression plate according to an embodiment of the disclosure.

FIG. 3 is an illustration of an interface 300 of the non-rotating compression plate 106 to the stationary gear 304 and the stationary plate 302 according to an embodiment of the disclosure. As explained below, the non-rotating compression plate 106 is powered by a stator 232 (704 in FIG. 7) comprising electromagnets 730/732/734 (FIG. 7) housed in a housing 230 (1002 in FIG. 10). When one of the electromagnets 730/732/734 such as a third phase electromagnet 734 electromagnetically pulls a first side 208 (FIG. 2) of the non-rotating compression plate 106 to the stator 704 (FIG. 7), the second side 210 (FIG. 2) of the non-rotating compression plate 106 is pushed against the stationary plate 302 (and the stationary gear 304), thereby compressing the flexible tube 102. The timing gear 110 (pericyclic gear 110) of the non-rotating compression plate 106 radially meshes with a stationary gear 304 of the stationary plate 302 (FIG. 2) along a plane of the stationary gear 304. The stationary gear 304 may be housed by a housing 702 (FIG. 7).

The non-rotating compression plate 106 meshes with the stationary gear 304 and the stationary plate 302 radially inward along a plane that contains the stationary gear 304 and the stationary plate 302. The timing gear 110 sits at a fixed radius from a fulcrum 726 (see also FIGS. 2 and 7). As the non-rotating compression plate 106 tilts (e.g., at an angle 234 (FIG. 2) of a center 206 of the non-rotating compression plate 106 from an axis 212 of the fulcrum 726), a radial location of the center 206 of the non-rotating compression plate 106 of gear teeth 222 of the timing gear 110 of the non-rotating compression plate 106 moves radially inward.

FIGS. 4 and 5 are illustrations of a clock-wise nutation (virtual elliptical wave nutation 400-500) of the non-rotating compression plate 106 according to an embodiment of the disclosure. Views 402, 404, 406, 502 and 504 show the non-rotating compression plate 106 nutating in a clock-wise direction 408 in response to electromagnetic force of the electromagnets 730/732/734 (FIG. 7). In other embodiments, nutation may be, for example but without limitation, in a counter-clock-wise direction which is opposite the direction of the clock-wise direction 408.

The nutation of the non-rotating compression plate 106 progressively compress the flexible tube 102 in a smooth continuous motion. The virtual elliptical wave nutation 400-500 creates a smooth and continuous line that is rotated. A radius of curvature (e.g., 614, FIG. 6) is the same as a radius of the flexible tube 102 in the peristaltic pump systems 100A, 100B and 1000 (FIG. 10), greatly reducing torque ripple and potential damage to pumped fluids. The non-rotating compression plate 106 driven by a plurality of electro-magnets 730/732/734 (FIG. 7) does not rotate, only a progressive motion of a virtual elliptical wave nutation 400-600 of the non-rotating compression plate 106 occurs. That motion is substantially identical to an optimal motion required for peristaltic pumping. Because motion is directly driven without need of rollers or roller gears, a simpler reduced cost and complexity pump system is provided that also does less potential damage to materials being pumped.

Torque is produced from an angular change of the non-rotating compression plate 106. When a stator pole of the stator 704 (FIG. 7) is energized, torque of the non-rotating compression plate 106 is in a direction that will reduce reluctance. In order to sustain rotation, a stator magnetic field rotates in advance of the rotor poles, thus constantly "pulling" the non-rotating compression plate 106 along.

Embodiments use smooth conical surfaces on the electromagnets 730/732/734 and pump side which creates a direct coupling from the virtual ellipse motor stator 704 (FIG. 7) to the pumping fluid 112 via two virtual ellipses (one is the motor pole, another is an opposite surface of the rotor 106).

FIG. 6 is an illustration of a relationship of electromagnetic driving force to a counter clock-wise nutation along the single radial line 614 of the non-rotating compression plate 106 generating a virtual ellipse motion (virtual elliptical wave nutation 600) according to an embodiment of the disclosure. A non-rotating compression plate projection 610 comprises an ellipse projection of the non-rotating compression plate 106 into an output gear plane 612. When a magnetic force is applied at a location 602 on a major axis of the non-rotating compression plate 106 (FIG. 1) at time T0, a maximum gear mesh occurs at a location 606 on a minor axis of the non-rotating compression plate 106 at time T0. When a magnetic force is applied at a location 604 on a major axis of the non-rotating compression plate 106 at time T1, a maximum gear mesh occurs at a location 608 on a minor axis of the non-rotating compression plate 106 at time T1. In this manner, a virtual ellipse motion of the virtual ellipse electric motor is generated.

FIG. 7 is an illustration of a partial view of an exemplary virtual ellipse electric motor 700 (116 in FIG. 1) that can drive the virtual elliptical wave nutation 400-600 of the non-rotating compression plate 106 according to an embodiment of the disclosure. The non-rotating compression plate 106 is rotationally coupled to the fulcrum 726 and is configured to nutate around the fulcrum 726. The non-rotating compression plate 106 comprises the timing gear 110.

During operation, the first side 208 (FIG. 2) of the non-rotating compression plate 106 is electromagnetically pulled to the stator 704, and a second side 210 (FIG. 2) of the non-rotating compression plate 106 is pushed against the stationary gear 304 and the stationary plate 302. A stationary gear 304 (also see FIG. 3) on the stationary plate 302 is meshed to the timing gear 110 and allows nutation about the fulcrum 726 but not rotation.

The stationary gear 304 on the stationary plate 302 is configured to mesh with the timing gear 110 and provide leverage to the non-rotating compression plate 106.

The stator 704 comprises one or more electromagnets such as a first phase electromagnet 730, a second phase electromagnet 732, and a third phase electromagnet 734.

The virtual elliptical wave nutation 400-600 of the non-rotating compression plate 106 may be driven by a virtual ellipse electrical motor 116/700 explained in more detail in the U.S. patent application Ser. No. 13/849,501 which is the parent application of the present disclosure as mentioned above in the cross-reference to related application section. Thus the surface 108 may comprise a plate (not shown) above the stator 704 of the virtual ellipse electrical motor 116/700 and the non-rotating compression plate 106 may comprise a wobble plate of the virtual ellipse electrical motor 116/700.

Figure 8:
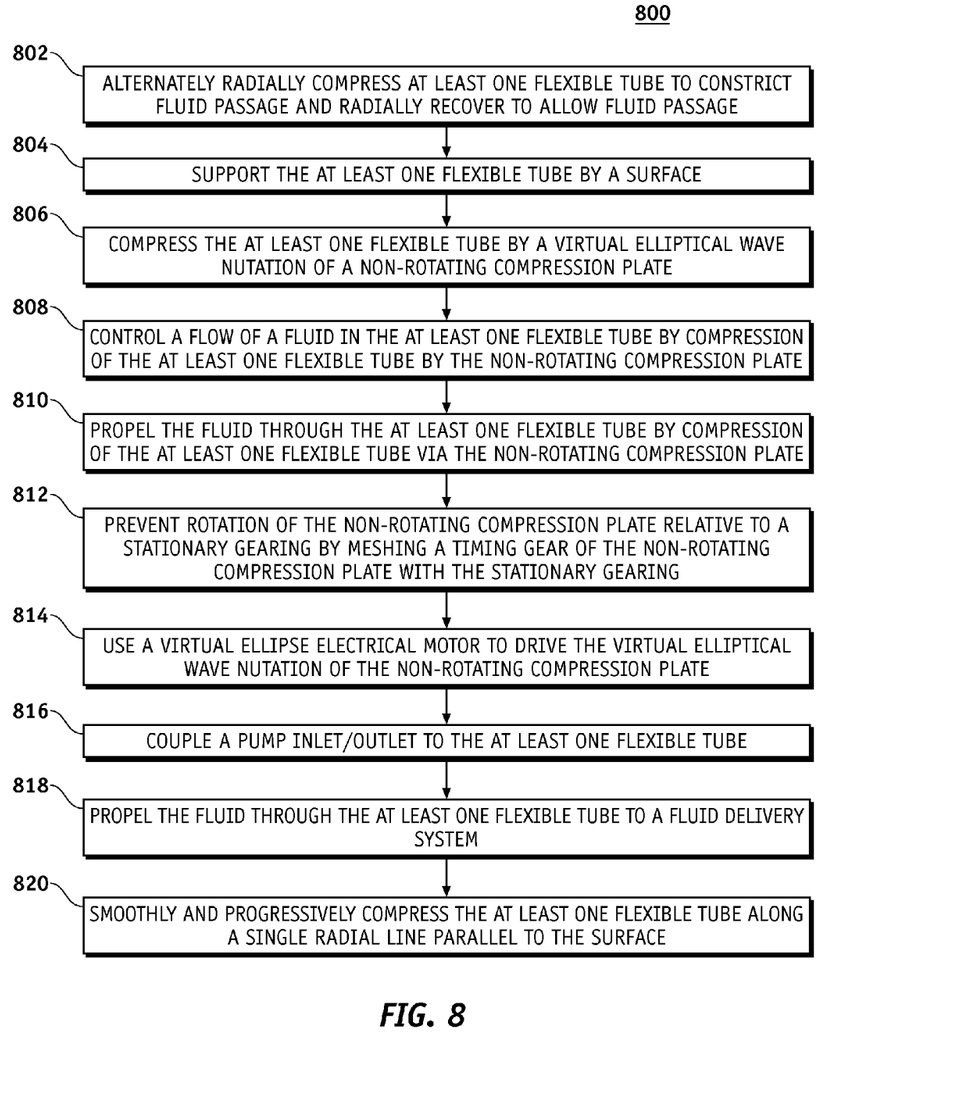
FIG. 8 is an illustration of an exemplary flowchart showing a process for producing a peristaltic pumping motion according to an embodiment of the disclosure.

FIG. 8 is an illustration of an exemplary flowchart showing a process 800 for producing a peristaltic pumping motion according to an embodiment of the disclosure. The various tasks performed in connection with process 800 may be performed mechanically, by software, hardware, firmware, or any combination thereof. For illustrative purposes, the following description of process 800 may refer to elements mentioned above in connection with FIGS. 1-7. In some embodiments, portions of the process 800 may be performed by different elements of the systems 100A, 100B and 1000, and the virtual ellipse electric motor 116/700 such as the flexible tube 102, the fulcrum 726, the non-rotating compression plate 106, the stationary gear 304, the stationary plate 302, the stator 704, etc. Process 800 may have functions, material, and structures that are similar to the embodiments shown in FIGS. 1-7. Therefore common features, functions, and elements may not be redundantly described here.

Process 800 may begin by alternately radially compressing at least one flexible tube such as the flexible tube 102 to constrict fluid passage and radially recover to allow fluid passage (task 802).

Process 800 may continue by supporting the at least one flexible tube 102 by a surface such as the surface 108/302 (task 804).

Process 800 may continue by compressing the at least one flexible tube 102 by a virtual elliptical wave nutation such as the virtual elliptical wave nutation 400-600 of a non-rotating compression plate such as the non-rotating compression plate 106 (task 806).

Process 800 may continue by controlling a flow of a fluid such as the fluid 112 in the at least one flexible tube 102 by compression of the at least one flexible tube 102 by the non-rotating compression plate 106 (task 808).

Process 800 may continue by propelling the fluid 112 through the at least one flexible tube 102 by compression of the at least one flexible tube 102 via the non-rotating compression plate 106 (task 810).

Process 800 may continue by preventing rotation of the non-rotating compression plate 106 relative to a stationary gearing such as the stationary gear 304 by meshing a timing gear such as the timing gear 110 of the non-rotating compression plate 106 with the stationary gearing 304 (task 812).

Process 800 may continue by using a virtual ellipse electrical motor such as the virtual ellipse electrical motor 116/700 to drive the virtual elliptical wave nutation 400-600 of the non-rotating compression plate 106 (task 814).

Process 800 may continue by coupling a pump inlet/outlet such as the pump inlet/outlet 104 to the at least one flexible tube 102 (task 816).

Process 800 may continue by propelling the fluid 112 through the at least one flexible tube 102 to a fluid delivery system such as the fluid delivery system 114 (task 818).

Process 800 may continue by smoothly and progressively compressing the at least one flexible tube 102 along a single radial line such as the single radial line 614 parallel to the surface 108/302 (task 820).

Figure 9:
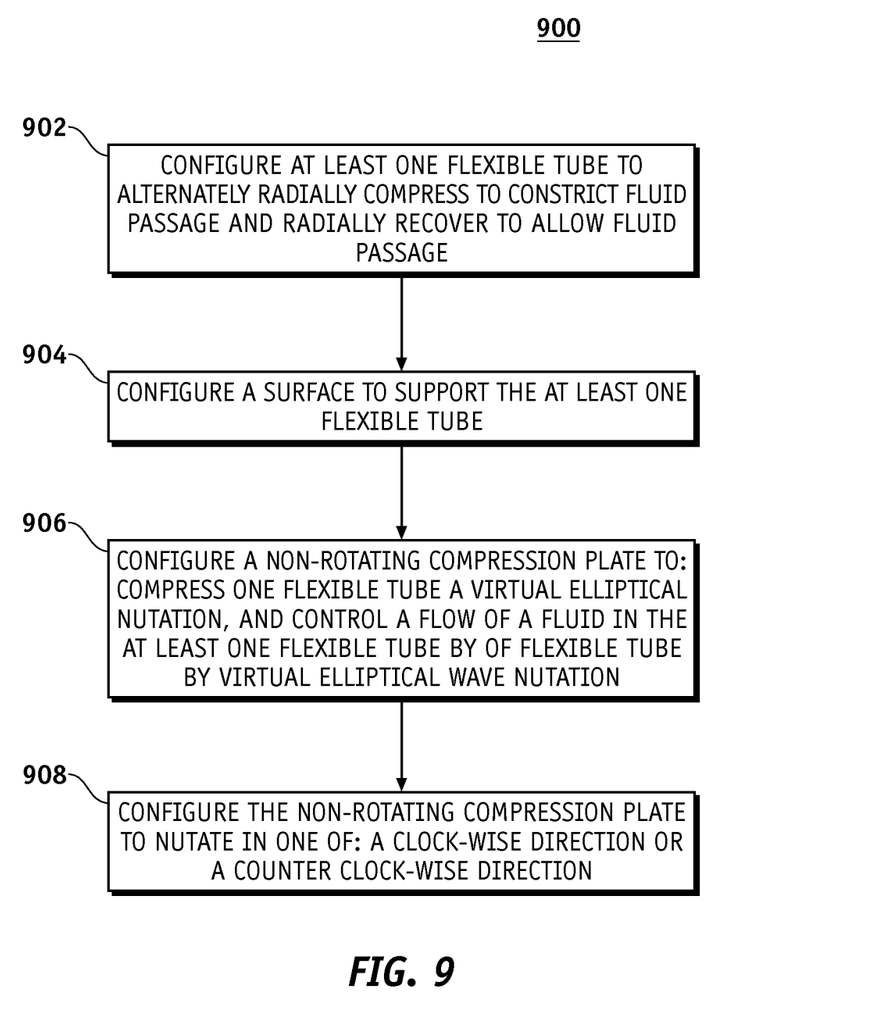
FIG. 9 is an illustration of an exemplary flowchart showing a process for producing a peristaltic pump according to an embodiment of the disclosure.

FIG. 9 is an illustration of an exemplary flowchart showing a process 900 for producing a peristaltic pump according to an embodiment of the disclosure. The various tasks performed in connection with process 900 may be performed mechanically, by software, hardware, firmware, or any combination thereof. For illustrative purposes, the following description of process 900 may refer to elements mentioned above in connection with FIGS. 1-7. In some embodiments, portions of the process 900 may be performed by different elements of the systems 100A, 100B and 1000, and the virtual ellipse electric motor 116/700 such as the flexible tube 102, the fulcrum 726, the non-rotating compression plate 106, the stationary gear 304, the stationary plate 302, the stator 704, etc. Process 900 may have functions, material, and structures that are similar to the embodiments shown in FIGS. 1-7. Therefore common features, functions, and elements may not be redundantly described here.

Process 900 may begin by configuring at least one flexible tube such as the flexible tube 102 to alternately radially compress to constrict fluid passage and radially recover to allow fluid passage (task 902).

Process 900 may continue by configuring a surface such as the surface 108/302 to support the at least one flexible tube 102 (task 904).

Process 900 may continue by configuring a non-rotating compression plate such as the non-rotating compression plate 106 to: compress the at least one flexible tube 102 by a virtual elliptical wave nutation such as the virtual elliptical wave nutation 400-600, and control a flow of a fluid such as the fluid 112 in the at least one flexible tube 102 by compression of the at least one flexible tube 102 by the virtual elliptical wave nutation 400-600 (task 906).

Process 900 may continue by configuring the non-rotating compression plate 106 to nutate in one of: a clock-wise direction or a counter clock-wise direction (task 908).

Figure 10:
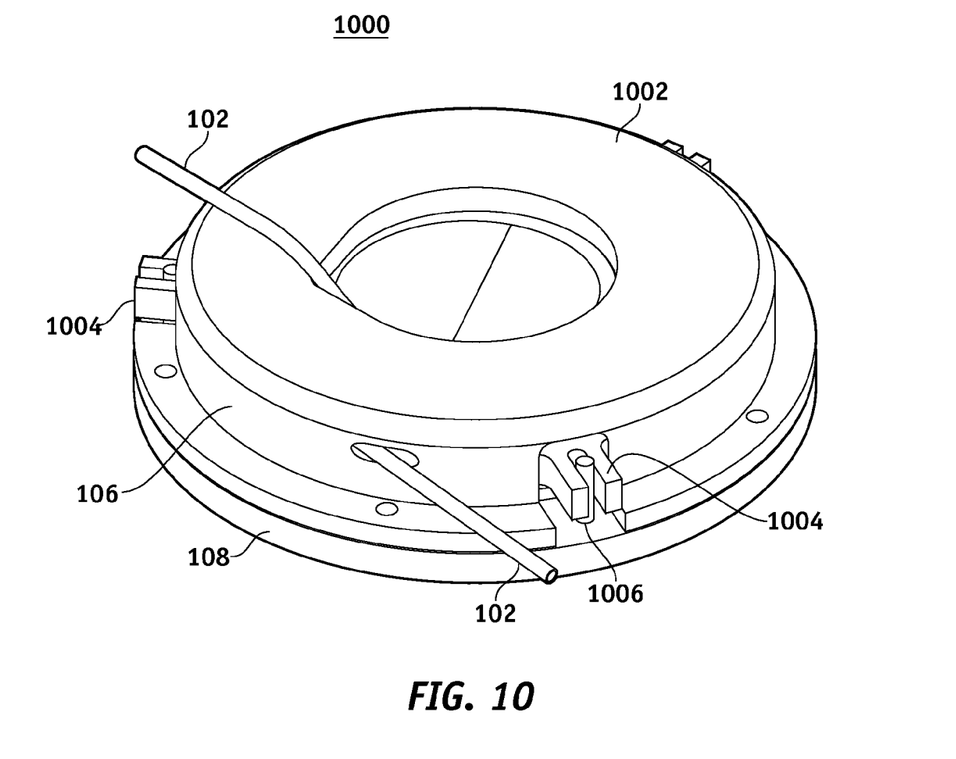
FIG. 10 is an illustration of an exemplary peristaltic pump system with a single flexible tube housed in a housing according to an embodiment of the disclosure.

FIG. 10 is an illustration of an exemplary peristaltic pump system 1000 with a single flexible tube 102 housed in a housing 1002 according to an embodiment of the disclosure. The peristaltic pump system 1000 (system 1000) incorporates a different anti-rotation mechanism instead of the timing gear 110 of the system 100A-100B. Pins 1006 in the surface 108 are inserted in the slots 1004 (respective slots) in the non-rotating compression plate 106 of the system 1000 to provide the anti-rotation mechanism for the non-rotating compression plate 106. The pins 1006 in the surface 108 provide lateral support to the slots 1004 in the non-rotating compression plate 106, and thereby stop the non-rotating compression plate 106 from rotating.

FIG. 11 is an illustration of the exemplary peristaltic pump system 1000 of FIG. 10 with the housing 1002 removed showing the pins 1006 and the slots 1004 that provide an anti-rotation mechanism for the non-rotating compression plate 106. As shown in FIG. 11, the tube 102 in the system 1000 is brought in tangentially on the inner radius and exits tangentially from the outer radius after completing a total of at least 360 degrees (e.g., typically more) of travel on the surface 108 to prevent back flow. The system 1000 may also be used with the multiple flexible tubes 102. In various embodiments, the fluid 112 may enter the tube 102 via the inner radius and exit via the outer radius, the fluid 112 may enter the tube 102 via the outer radius and exit via the inner radius, with multiple tubes the fluid 112 may enter the tube 102 via both the inner radius and the outer radius via different tubes, and exit via both the inner radius and the outer radius via the different tubes respectively, or other suitable arrangement.

In this manner, embodiments of the disclosure provide a system and methods for producing a peristaltic pumping motion using virtual ellipse motor are presented. Embodiments provide a peristaltic pumping motion, by a virtual ellipse motor where a non-rotating compression plate driven by a plurality of electro-magnets does not rotate, only a progressive motion of a virtual elliptical wave nutation of the non-rotating compression plate occurs to pump a fluid. Thereby, torque ripple is greatly reduced and potential damage on pumped fluids is significantly reduced. There is no need to provide any valves, which could possibly leak, nor is there any contamination of liquid to be pumped, since the liquid is not contacted by component parts and lubricants used in the pump.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-7, and 10-11 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A peristaltic pump system comprising:
   at least one flexible tube configured to alternately radially compress to constrict a fluid passage way of the flexible tube and allow the flexible tube to radially recover to allow fluid to pass through the fluid passage way;
   a surface configured to support the flexible tube;
   a non-rotating compression plate configured to:
      compress the flexible tube against the surface by a virtual elliptical wave nutation; and
   a virtual ellipse electrical motor configured to drive the virtual elliptical wave nutation of the non-rotating compression plate, wherein the virtual ellipse electrical motor comprises: a stationary gear disposed on the surface, a stator comprising a plurality of electromagnets operable to electromagnetically attract a first side of the non-rotating compression plate such that the non-rotating compression plate is leveraged against the stationary gear and a fulcrum in order to drive the virtual elliptical wave nutation.

2. The system of claim 1, wherein the non-rotating compression plate is further configured to propel the fluid through the flexible tube by compression of the flexible tube.

3. The system of claim 1, wherein the non-rotating compression plate comprises a timing gear configured to mesh with the stationary gearing such that the non-rotating compression plate cannot rotate relative to the stationary gearing.

4. The system of claim 1, wherein the at least one flexible tubing smoothly and progressively compresses along a single radial line parallel to the surface.

5. The system of claim 1, wherein the non-rotating compression plate comprises a wobble plate of the virtual ellipse electrical motor.

6. The system of claim 1, wherein the non-rotating compression plate comprises pins in the surface inserted in respective slots in the non-rotating compression plate configured to provide an anti-rotation mechanism for the non-rotating compression plate.

7. The system of claim 1, wherein the non-rotating compression plate is further configured to propel the fluid through the flexible tube by compression of the at least one flexible tube to a fluid delivery system.

8. The system of claim 1, wherein the peristaltic pump system comprise a medical pump.

9. The system of claim 1, wherein the fluid comprises blood.

10. A method of producing a peristaltic pumping motion comprising:
    alternately radially compressing at least one flexible tube to constrict a fluid passage way of the flexible tube and allowing the flexible tube to radially recover to allow a fluid to pass;
    wherein a surface is configured to support the flexible tube;
    wherein a non-rotating compression plate is configured to: compress the flexible tube by a virtual elliptical wave nutation;
    wherein a virtual ellipse electrical motor is configured to drive the virtual elliptical wave nutation of the non-rotating compression plate, wherein the virtual ellipse electrical motor comprises: a stationary gear disposed on the surface, a stator comprising a plurality of electromagnets operable to electromagnetically attract a first side of the non-rotating compression plate such that a first side of the non-rotating compression plate is leveraged against the stationary gear and a fulcrum in order to drive the virtual elliptical wave nutation.

11. The method of claim 10, further comprising propelling the fluid through the at least one flexible tube by compression of the at least one flexible tube via the non-rotating compression plate.

12. The method of claim 10, further comprising preventing rotation of the non-rotating compression plate relative to the stationary gearing by meshing a timing gear of the non-rotating compression plate with the stationary gearing.

13. The method of claim 10, further comprising providing an anti-rotation mechanism for the non-rotating compression plate by pins in the surface inserted in respective slots in the non-rotating compression plate.

14. The method of claim 10, further comprising propelling the fluid through the at least one flexible tube to a fluid delivery system.

15. The method of claim 10, further comprising smoothly and progressively compressing the at least one flexible tube along a single radial line parallel to the surface.

16. The method of claim 10, wherein the fluid comprises blood.

17. A method of producing a peristaltic pump
    wherein at least one flexible tube is configured to be alternately radially compressed to constrict a fluid passage way of the flexible tube and allowing the flexible tube to radially recover to allow a fluid to pass;
    wherein a surface is configured to support the flexible tube; and
    wherein a non-rotating compression plate is configured to: compress the flexible tube by a virtual elliptical wave nutation; and a virtual ellipse electrical motor configured to drive the virtual elliptical wave nutation of the non-rotating compression plate, wherein the virtual ellipse electrical motor comprises: a stationary gear disposed on the surface, a stator comprising a plurality of electromagnets operable to electromagnetically attract a first side of the non-rotating compression plate such that a first side of the non-rotating compression plate is leveraged against the stationary gear and a fulcrum in order to drive the virtual elliptical wave nutation.

18. The method of claim 17, further comprising configuring the non-rotating compression plate to nutate in one of: a clock-wise direction or a counter clock-wise direction.

* * * * *